United States Patent
Shelke et al.

(10) Patent No.: US 11,193,573 B1
(45) Date of Patent: Dec. 7, 2021

(54) DIFFERENTIAL PINION BEARING ASSEMBLY

(71) Applicant: Schaeffler Technologies AG & Co. KG, Herzogenaurach (DE)

(72) Inventors: Apurva Shelke, Troy, MI (US); Alaa Makke, Farmington Hills, MI (US); Stefan Tojcic, Windsor (CA); Ossama Saada, Birmingham, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/025,179

(22) Filed: Sep. 18, 2020

(51) Int. Cl.
*F16H 48/08* (2006.01)
*F16C 19/18* (2006.01)
*F16H 48/42* (2012.01)
*F16H 57/023* (2012.01)
*F16H 57/032* (2012.01)

(52) U.S. Cl.
CPC ......... *F16H 57/023* (2013.01); *F16C 19/184* (2013.01); *F16H 48/08* (2013.01); *F16H 57/032* (2013.01); *F16H 2048/423* (2013.01)

(58) Field of Classification Search
CPC .......................................... F16C 19/18–19/188
See application file for complete search history.

(56) References Cited

U.S. PATENT DOCUMENTS

| | | | |
|---|---|---|---|
| 1,934,721 A * | 11/1933 | Lawler | F16H 48/12 74/650 |
| 4,305,313 A | 12/1981 | Konkle | |
| 4,597,311 A | 7/1986 | Takeda | |
| 5,806,371 A | 9/1998 | Hibbler et al. | |
| 6,293,704 B1 * | 9/2001 | Gradu | F16C 19/386 384/557 |
| 6,318,201 B1 | 11/2001 | Yoshioka | |
| 6,532,660 B1 | 3/2003 | Bear | |
| 7,287,911 B2 | 10/2007 | Dodoro et al. | |
| 8,092,096 B2 * | 1/2012 | Shibata | F16C 33/64 384/544 |
| 10,436,307 B2 * | 10/2019 | Newcomb | B33Y 10/00 |
| 10,539,218 B2 * | 1/2020 | Annigeri | F16H 48/42 |
| 2004/0060384 A1 | 4/2004 | Guo | |
| 2005/0238273 A1 * | 10/2005 | Kawamura | F16C 33/6603 384/504 |
| 2007/0104403 A1 * | 5/2007 | Kawamura | F16C 19/548 384/494 |
| 2007/0111841 A1 | 5/2007 | Smith | |
| 2008/0020888 A1 | 1/2008 | Kearney | |
| 2013/0182983 A1 | 7/2013 | Kwasniewski et al. | |

FOREIGN PATENT DOCUMENTS

WO    2008/077676 A1    7/2008

\* cited by examiner

*Primary Examiner* — Ernesto A Suarez
*Assistant Examiner* — James J Taylor, II

(57) ABSTRACT

A differential includes a unitized double row angular contact ball bearing supporting a pinion stub shaft. The bearing includes two inner rings which are slightly separated before assembly. As the stub shaft is inserted into the bearing, one of the inner rings is pushed against a land such as the back of the pinion gear. Pushing the inner rings together ensures a suitable pre-load. The inner rings have an interference fit with the stub shaft such that friction maintains the pre-load without a nut. The bearing and shaft are then inserted between halves of a two-piece case.

5 Claims, 4 Drawing Sheets

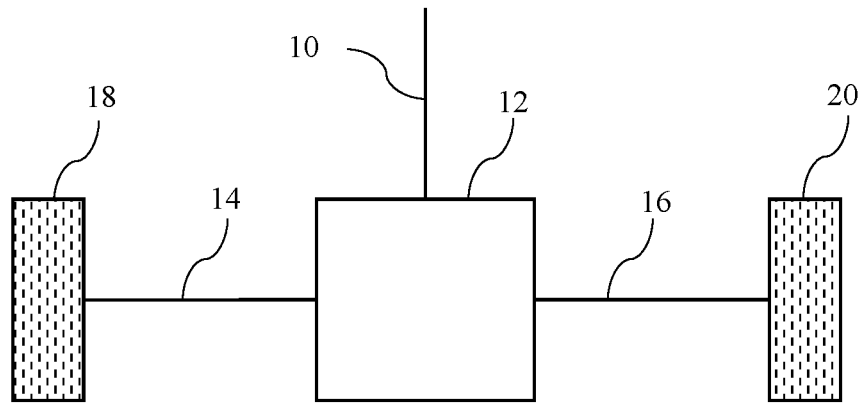
FIG. 1 – PRIOR ART
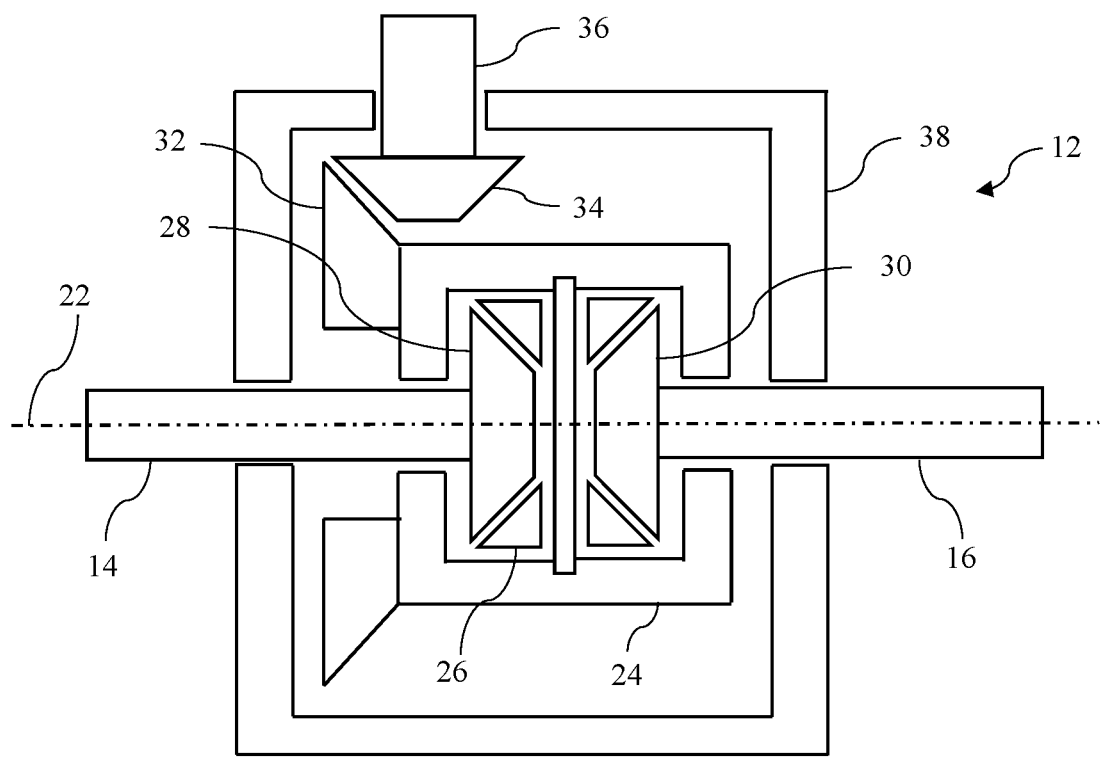
FIG. 2 – PRIOR ART

DIFFERENTIAL PINION BEARING ASSEMBLY

TECHNICAL FIELD

The disclosure relates to the field of differential assemblies. More particularly, it relates to a differential assembly using a unitized double row angular contact ball bearing to support the pinion shaft.

BACKGROUND

FIG. 1 schematically illustrates a portion of a common rear wheel drive powertrain layout. The front wheel portion of many four-wheel drive powertrains have a similar layout. Power from an engine is transmitted via a driveshaft 10, usually via a variable ratio transmission. Differential 12 divides the power between a left half-shaft 14 and a right half-shaft 16. Left half-shaft 14 drives left wheel 18 while right half-shaft 16 drives right wheel 20. Differential 12 serves several functions. The differential changes the axis of rotation roughly 90 degrees. The differential provides a speed reduction such that the half-shafts rotate slower than the driveshaft. Finally, the differential permits slight speed differences between the left half-shaft and the right half-shaft to accommodate the fact that, when a vehicle turns, an outside wheel must traverse a longer distance than an inside wheel.

FIG. 2 illustrates a common kinematic arrangement for a differential 12. Half-shafts 14 and 16 are supported for rotation about an axle axis 22. A differential carrier 24 is also supported for rotation about axle axis 22. Beveled differential planet gears 26 are supported to rotate with respect to the differential carrier 24. The differential planet gears 26 mesh with beveled side gears 28 and 30. Side gear 28 is fixed to half-shaft 14 while side gear 30 is fixed to half-shaft 16. This arrangement constrains the differential carrier 24 to rotate at a speed which is a weighted average of the speeds of the two half-shafts. A ring gear 32 is fixed to the differential carrier 24. Ring gear 32 meshes with pinion gear 34 which is fixed to stub shaft 36. Stub shaft 36 is adapted for fixation to driveshaft 10. The gearing of differential 12 is supported in differential housing 38.

SUMMARY

A differential includes a housing, a pinion stub shaft, and a unitized double row angular contact ball bearing. The pinion stub shaft has a pinion gear at one end. A unitized double row angular contact ball bearing has an outer ring fixed to the housing, two inner rings fixed to the pinion stub shaft by interference fit, and two rows of balls. Each row of balls is radially between the outer ring and one of the inner rings. The differential may not have a nut to maintain a bearing pre-load in the unitized double row angular contact ball bearing. The pinion stub shaft, the outer ring, and the two inner rings may be made of steel. The housing may be made of aluminum. The outer ring may remain compressed by the housing at a first temperature of at least 150° C. The housing may not yield at a second temperature of no more than −40° C. The housing may be a split housing. A ring gear may be supported for rotation about an axle axis and in meshing contact with the pinion gear. The first and second half-shafts may be supported for rotation about the axle axis. Differential gearing may be configured to constrain a speed of the ring gear to be an average of speeds of the half shafts.

A method of assembling a differential includes inserting a pinion stub shaft into the inner rings of a unitized bearing, pushing one of the inner rings against a land, and then pushing the inner rings together. The unitized bearing is a double row angular contact ball bearing having an outer ring, two inner rings, and two rows of balls. Each row of balls is located radially between the outer ring and one of the inner rings. Prior to insertion of the stub shaft, the inner rings are separated axially. The pinion stub shaft has a pinion gear on a first end. Pushing the inner rings together establishes an axial pre-load between the rows of balls. The outer ring may then be inserted into a bottom housing. A ring gear may be inserted into the bottom housing in meshing contact with the pinion gear. A top housing may be placed over the bottom housing, enclosing the ring gear and compressing the outer ring between the bottom housing and the top housing. The top housing may then be fastened to the bottom housing. The pinion stub shaft, the outer ring, and the two inner rings may be made of steel. The housing may be made of aluminum. The outer ring may remain compressed by the housing at a first temperature of at least 150° C. The housing may not yield at a second temperature of no more than −40° C.

BRIEF DESCRIPTION OF THE DRAWINGS

FIG. 1 is a schematic representation of a rear portion of a rear wheel drive powertrain.

FIG. 2 is a schematic cross section of differential assembly.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 3:
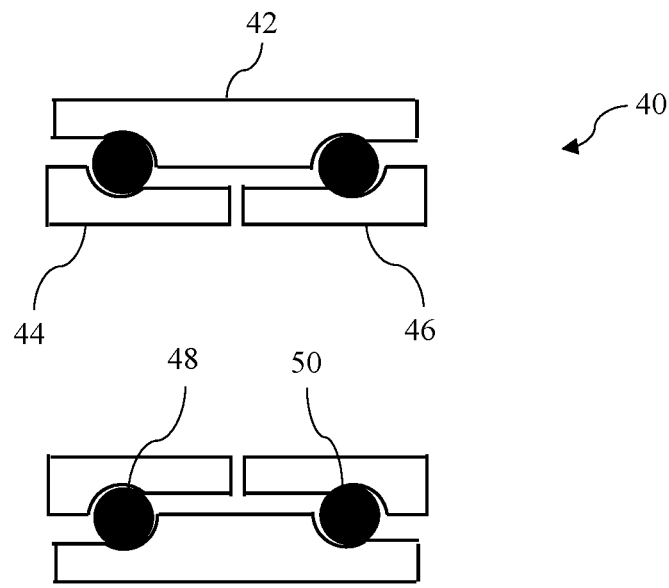
FIG. 3 is a cross section of a unitized double row angular contact ball bearing.

FIGS. 3-6 illustrate a process for assembling a differential. Specifically, they illustrate a process for installing a unitized double row angular contact ball bear to support the pinion stub shaft. The process begins with a unitized double row angular contact ball bearing 40. A unitized bearing is a bearing that stays together so that it can be handled as a single piece before it is installed. Bearing 40 includes an outer ring 42 and two inner rings 44 and 46. A first row of balls 48 is located radially between inner ring 44 and outer ring 42. A second row of balls 50 is located radially between inner ring 46 and outer ring 42. Cages (not shown) locate the balls within each row circumferentially with respect to one another. In the uninstalled condition, as illustrated in FIG. 3, there is an axial gap between the inner rings 44 and 46.

Figure 4:
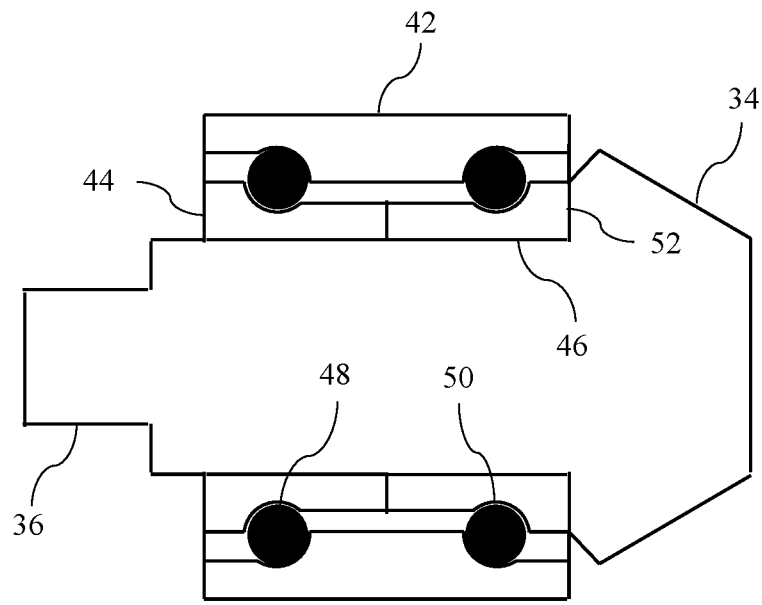
FIG. 4 is a cross section of the ball bearing of FIG. 3 assembled onto a pinion stub shaft.

As shown in FIG. 4, a stub shaft 36 which includes the pinion gear 34 is pushed axially into the bearing 40. Inner ring 46 is pushed against a land 52 of the stub shaft. In the illustrated embodiment, land 52 is formed by the back side of pinion gear 34. Inner ring 44 is then push against inner ring 46. Pushing the inner rings together applies an axial pre-load to the bearing. Due to the pre-load, each row of balls exerts a radial separating force and an axial separating force between the respective inner ring and outer ring. Proper operation of the bearing requires that this pre-load be in an acceptable range. An insufficient pre-load results in play or some balls coming out of contact with one of the rings, especially at hot temperatures. An excessive pre-load results in excessive resistance to rotation.

The inner and outer rings are dimensioned such that pushing inner ring 44 into contact with inner ring 46 establishes a pre-load in the acceptable range. The inner rings and the stub shaft are dimensioned such that there is a radial interference fit. As a result of this interference fit, friction prevents inner ring 44 from sliding away from pinion gear 34. Unlike conventional pinion shaft bearing assemblies, a threaded nut is not needed to establish and maintain the desired pre-load. This simplifies the assembly process.

Figure 5:
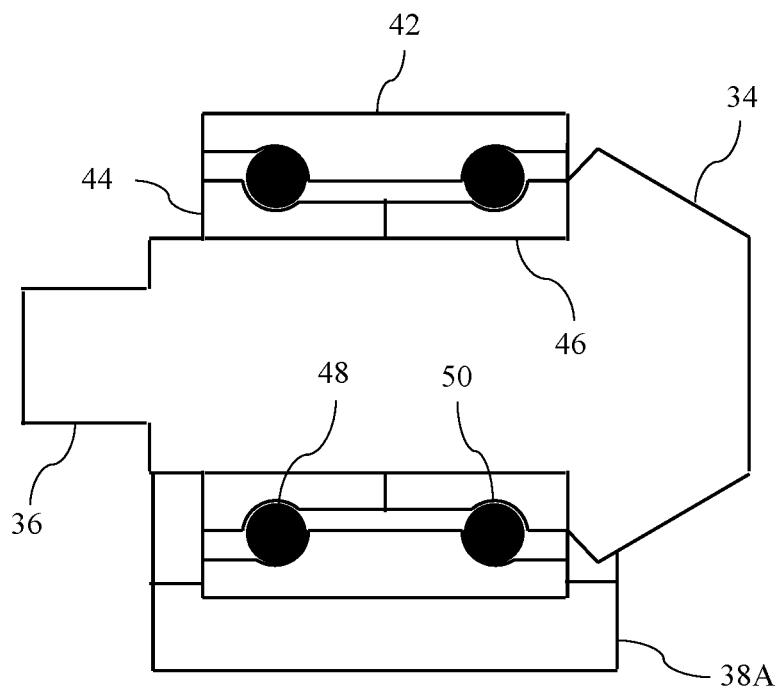
FIG. 5 is a cross section of the ball bearing and stub shaft of FIG. 4 assembled into a bottom half of a differential housing.
Figure 6:
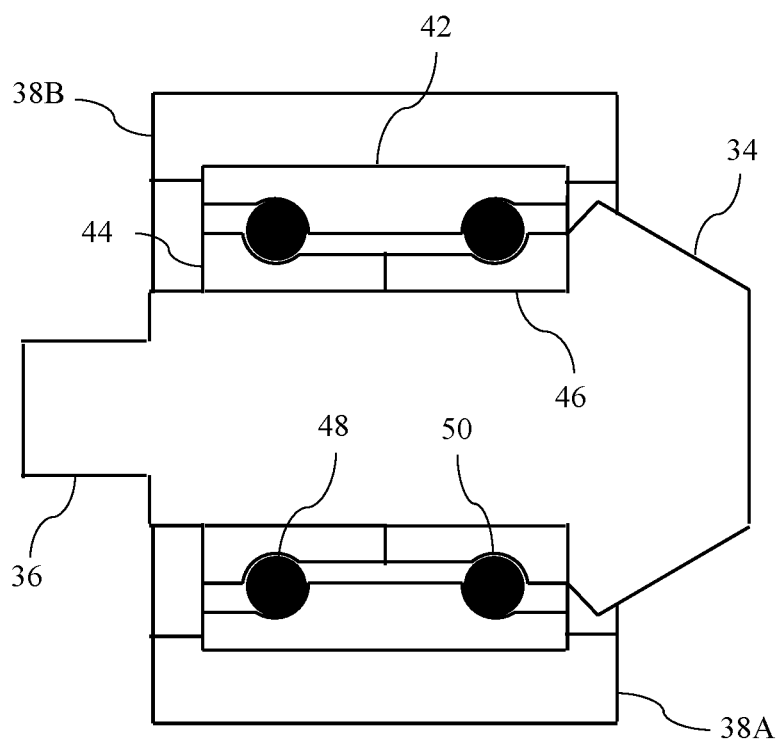
FIG. 6 is a cross section of the pinion portion of a fully assembled differential having the ball bearing of FIG. 3.
Figure 7:
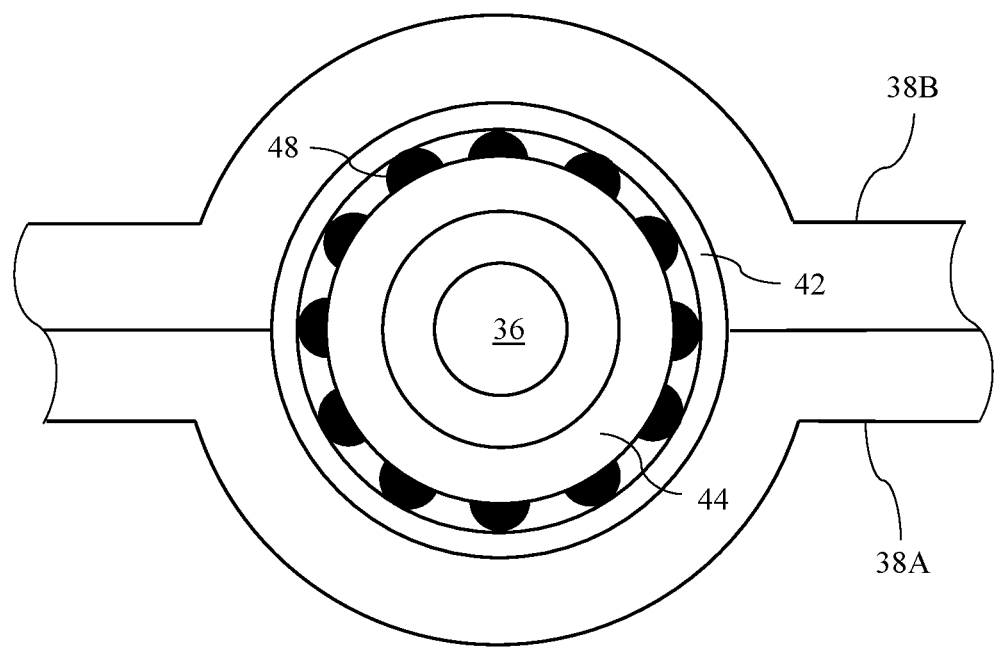
FIG. 7 is an end view of the pinion portion of a fully assembled differential of FIG. 7.

Housing 38 is preferably a two-piece housing including a bottom half 38A and a top half 38B. FIG. 5 illustrates the pinion portion of the differential assembly after the pinion stub shaft 36 and bearing 40 are inserted into the bottom half 38A of the differential housing 38. Other components of the differential assembly, such as carrier 24, ring gear 32, and half shafts 14 and 16 are also inserted into the bottom half of the housing prior to mating the bottom half and the top half. FIG. 6 illustrates the same portion of the differential assembly after the top half 38B of the housing has been mated to the bottom half 38A. FIG. 7 is an end-view of this portion of the differential assembly.

Stub shaft 36, outer ring 42, and inner rings 44 and 46 are preferable made of a hard metal such as steel. Housing halves 38A and 38B are preferably made of a lightweight metal such as aluminum. Although both metals expand as the temperature increases, they do not expand at the same rate. At very high temperatures, excess expansion of the housing could result in the outer ring not being compressed. However, with proper dimensioning, a compression fit is maintain to temperatures of at least 150° C. At very low temperatures, excess contraction of the housing could result in plastic deformation of the housing. However, with proper dimensioning, the housing does not yield at temperatures down to at least −40° C.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A differential comprising:
   a housing;
   a pinion stub shaft having a pinion gear at one end; and
   a unitized double row angular contact ball bearing having an outer ring fixed to the housing, two inner rings fixed to the pinion stub shaft by interference fit, and two rows of balls, each row of balls radially between the outer ring and one of the inner rings; and
   wherein:
   the outer ring remains compressed by the housing at a first temperature of at least 150° C.; and
   the housing does not yield at a second temperature of no more than −40° C.

2. The differential of claim 1 not having a nut to maintain a bearing pre-load in the unitized double row angular contact ball bearing.

3. The differential of claim 1 wherein:
   the pinion stub shaft, the outer ring, and the two inner rings are made of steel; and
   the housing is made of aluminum.

4. The differential of claim 1 wherein the housing is a split housing.

5. The differential of claim 1 further comprising:
   a ring gear supported for rotation about an axle axis and in meshing contact with the pinion gear;
   first and second half-shafts supported for rotation about the axle axis; and
   differential gearing configured to constrain a speed of the ring gear to be an average of speeds of the half shafts.

* * * * *